Aug. 5, 1924.
W. L. YOUNG
1,503,738
HOG GAMBREL
Filed April 3, 1923
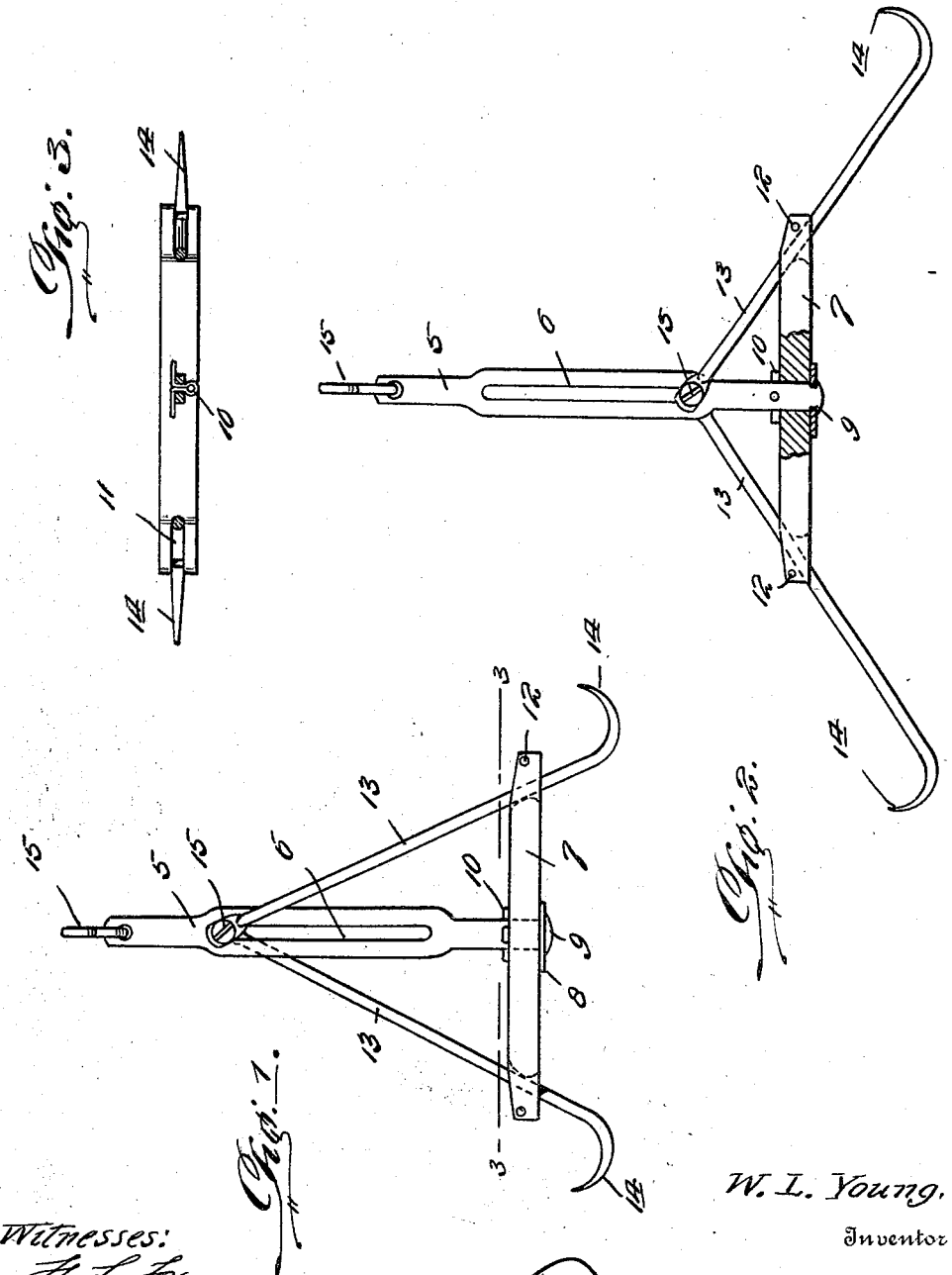
W. L. Young,
Inventor Patented Aug. 5, 1924.

1,503,738

UNITED STATES PATENT OFFICE.

WILMER L. YOUNG, OF HEATON, NORTH DAKOTA.

HOG GAMBREL.

Application filed April 3, 1923. Serial No. 629,551.

*To all whom it may concern:*

Be it known that I, WILMER L. YOUNG, a citizen of the United States, residing at Heaton, in the county of Wells and State of North Dakota, have invented certain new and useful Improvements in Hog Gambrels, of which the following is a specification.

In carrying out the present invention, it is my purpose to provide a hog gambrel, wherein the same comprises a pair of hook elements for engagement with the hind legs of a hog, the device being so adapted as to spread the legs of the animal when the same is raised to a supporting position for facilitating the proper butchering or dressing of the animal.

A further purpose of this invention is the provision of such a device that will embrace the desired features of simplicity, durability and efficiency, the same consisting of relatively few parts, and these so correlated with each other, as to reduce the possibility of derangement to a minimum.

The nature and advantages of the invention will be better understood when the following detailed description is read in connenction with the accompanying drawings, the invention residing in the construction, combination, and arrangement of parts as claimed.

In the drawing forming part of this application, like numerals of reference indicate similar parts in the several views, and wherein:—

Figure 1 is an elevation of my improved gambrel with the hook elements shown as being extended to a closed position.

Figure 2 is a similar view, partly in cross section, disclosing the hook elements in open position, and Figure 3 is a detail cross section upon the line 3—3 of Figure 1.

My device contemplates the provision of a flat-like rod 5 of considerable length, that is provided intermediate its ends with a relatively elongated slot 6. The lower end of this rod 5 engages through an opening in a cross bar 7, and is secured thereto, through the medium of a plate 8, that is provided with a central slot, through which is engaged the end of the rod, the opposite edges of the slot within this plate engaging within notches 9 formed adjacent the end of the rod 5. Immediately above the cross bar 7 the rod 5 is provided with an opening for the reception of a cotter pin 10, this cotter pin and the said plate 8 cooperating with each other for effectively maintaining the said bar in position upon the rod.

The opposite ends of the bar 7 are slotted at 11, the inner edges of these slots being rounded as clearly shown in Figure 1. Extending through these slots, and prevented from disengagement therefrom through the medium of cross pins 12 are upwardly and inwardly extending rods 13. The lower ends of these rods are formed with outwardly extending hooks 14, the opposite ends of the rods being pivotally secured together, through the medium of a screw or the like 15 that extends through the said slot 6 of the rod 5, it being noted that the rods 13 are positioned upon opposite sides of the member 5. Upon the upper end of the rod 5 is a supporting clevis 16, and in view of the above description, it will at once be apparent that when the gambrel is in the position of Figure 1, the hooked ends of the rods 13 may be extended into the hind legs of an animal, and that when the device is raised for positioning upon a support, the rod 5 and cross bar 7 will move upwardly and occasion an outward swinging movement of the rods 13 for consequently extending the legs of the animal.

Although I have herein shown and described the preferred embodiment of the present invention, it is nevertheless to be understood that minor changes may be made therein, without departing from the spirit and scope of the invention as claimed.

Having thus described my invention, what I claim as new, and desire to secure by Letters Patent is:

A gambrel comprising a bar provided with a longitudinally extending slot intermediate the ends, means carried at the upper end of the bar for connecting it to a support, a pin extending transversely through an opening in the bar above the lower end thereof, a plate mounted on the lower end of the bar, a cross bar having an opening for receiving the lower end of the first mentioned bar, said cross bar being disposed between the plate and the pin and provided with slotted end portions, rods slidably mounted in the slots and formed with hooked extremities at the lower outer ends thereof, the upper inner ends of said rods being disposed at the opposite sides of the bar, and a bolt extending transversely through the ends of the rod slidably mounted in the slot.

In testimony whereof I affix my signature.

WILMER L. YOUNG.